(12) United States Patent
Kondo et al.

(10) Patent No.: US 12,522,165 B2
(45) Date of Patent: Jan. 13, 2026

(54) VEHICLE FRONT STRUCTURE

(71) Applicant: HONDA MOTOR CO., LTD., Tokyo (JP)

(72) Inventors: Takehiro Kondo, Tokyo (JP); Yosuke Shoji, Tokyo (JP); Wataru Tsuboi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 427 days.

(21) Appl. No.: 18/172,457

(22) Filed: Feb. 22, 2023

(65) Prior Publication Data

US 2023/0271582 A1    Aug. 31, 2023

(30) Foreign Application Priority Data

Feb. 25, 2022   (JP) .................... 2022-028433

(51) Int. Cl.
*B60R 19/24* (2006.01)
*B62D 21/02* (2006.01)
(Continued)

(52) U.S. Cl.
CPC .............. *B60R 19/24* (2013.01); *B62D 21/02* (2013.01); *B62D 21/152* (2013.01); *B62D 25/08* (2013.01); *B60R 2019/247* (2013.01)

(58) Field of Classification Search
CPC .... B62D 21/152; B62D 25/08; B62D 25/082; B62D 25/084; B62D 25/085;
(Continued)

(56) References Cited

U.S. PATENT DOCUMENTS 11,667,333 B2 * 6/2023 Abiko ................. B62D 25/085
                                                    296/187.09
11,679,808 B2 * 6/2023 Kim ..................... B62D 21/11
                                                    296/187.09
(Continued)

FOREIGN PATENT DOCUMENTS

CN    109131575 A    1/2019
CN    110077469 A    8/2019
(Continued)

OTHER PUBLICATIONS

Japanese Office Action received in corresponding Japanese application No. 2022-028433 dated Jun. 13, 2023 with English translation (8 pages).

(Continued)

*Primary Examiner* — Amy R Weisberg
*Assistant Examiner* — Denise Lynne Esquivel
(74) *Attorney, Agent, or Firm* — Rankin, Hill & Clark LLP

(57) ABSTRACT

A vehicle front structure includes: a front side-frame extending in a vehicle front-rear direction; and a lower member extending in the vehicle front-rear direction at a position outer in a vehicle width direction than the front side-frame, wherein a front end of the front side-frame and a front end of the lower member are coupled with each other, an outer end in the vehicle width direction of the front side-frame is inclined so as to be positioned outer in the vehicle width direction toward a front of a vehicle, and an inner end in the vehicle width direction of the lower member extends in the vehicle front-rear direction, without being inclined inward in the vehicle width direction toward the front of the vehicle.

3 Claims, 5 Drawing Sheets

(51) Int. Cl.
 *B62D 21/15* (2006.01)
 *B62D 25/08* (2006.01)
(58) Field of Classification Search
 CPC ...... B62D 27/023; B62D 21/02; B60R 19/24; B60R 19/02; B60R 2019/247
 USPC .............. 296/187.09, 187.1, 187.12, 193.09, 296/203.02; 293/155
 See application file for complete search history.

(56) References Cited

U.S. PATENT DOCUMENTS

| | | | | |
|---|---|---|---|---|
| 11,713,084 | B2* | 8/2023 | Schmidt | B62D 21/152 296/187.09 |
| 11,772,704 | B2* | 10/2023 | Kim | B62D 21/152 296/203.02 |
| 2016/0236718 | A1* | 8/2016 | Tatsuwaki | B60R 19/34 |
| 2017/0217501 | A1 | 8/2017 | Takeda | |
| 2018/0370571 | A1 | 12/2018 | Sekiya et al. | |
| 2019/0016283 | A1* | 1/2019 | Fujii | B60R 19/36 |
| 2019/0225272 | A1 | 7/2019 | Yoshida et al. | |
| 2019/0276094 | A1* | 9/2019 | Kondo | B62D 25/08 |
| 2020/0140015 | A1* | 5/2020 | Kondo | B62D 21/152 |
| 2021/0086835 | A1 | 3/2021 | Serada et al. | |
| 2023/0271581 | A1* | 8/2023 | Nambu | B62D 25/08 296/187.09 |

FOREIGN PATENT DOCUMENTS

| | | |
|---|---|---|
| JP | 2015-147549 A | 8/2015 |
| JP | 2017-136947 A | 8/2017 |
| JP | 2021-054389 A | 4/2021 |

OTHER PUBLICATIONS

Chinese Office Action received in corresponding Chinese application No. 202310031315.1 dated Jun. 30, 2025 with English translation (13 pages).

* cited by examiner

VEHICLE FRONT STRUCTURE

CROSS-REFERENCE TO RELATED APPLICATION

This application claims the benefit of priority to Japanese Patent Application No. 2022-028433 filed on Feb. 25, 2022, the disclosures of all of which are hereby incorporated by reference in their entireties.

TECHNICAL FIELD

The present invention relates to a vehicle front structure.

BACKGROUND OF THE INVENTION

There has been a demand in recent years, for improving fuel efficiency of automobiles, in view of improving the global environment to prevent natural disasters. At the same time, there has been a demand for maintaining or improving collision safety of vehicles. To satisfy these demands, high-strength and lightweight vehicle body structures have been developed. For frames, which are structural members for vehicles to build frameworks of the vehicle bodies, steel plates for forming the frames have been made stronger and thinner to reduce weight of the body structures while maintaining conventional collision performance. As a vehicle front structure, Japanese Patent Application Publication No. 2017-136947 describes a structure of a front end of a front side-frame coming closer to a lower member while becoming wider outward in a vehicle width direction, and a front end of the lower member coming closer to the front side-frame while being inclined inward in the vehicle width direction.

SUMMARY

Problems to be Solved

With the structure, in the event of an offset collision of a vehicle, a frontal collision load is transmitted to the front side-frame and the lower member. Here, as the lower member has a structure of being bent in the vehicle width direction, there is a risk of the load failing to be suitably transmitted thereto.

The present invention is devised in view of the above-identified problem and is intended to provide a vehicle front structure to suitably receive a frontal collision load in the event of an offset collision.

Solution to Problem

A vehicle front structure of the present invention to solve the above-identified problem includes: a front side-frame extending in a vehicle front-rear direction; and a lower member extending in the vehicle front-rear direction at a position outer in a vehicle width direction than the front side-frame, wherein a front end of the front side-frame and a front end of the lower member are coupled with each other, an outer end in the vehicle width direction of the front side-frame is inclined so as to be positioned outer in the vehicle width direction toward a front of a vehicle, and an inner end in the vehicle width direction of the lower member extends in the vehicle front-rear direction, without being inclined inward in the vehicle width direction toward the front of the vehicle.

Advantageous Effects of the Invention

The present invention improves efficiency of absorbing a collision load by the lower member, to allow for suitably receive a frontal collision load in the event of an offset collision.

DETAILED DESCRIPTION

Figure 1:
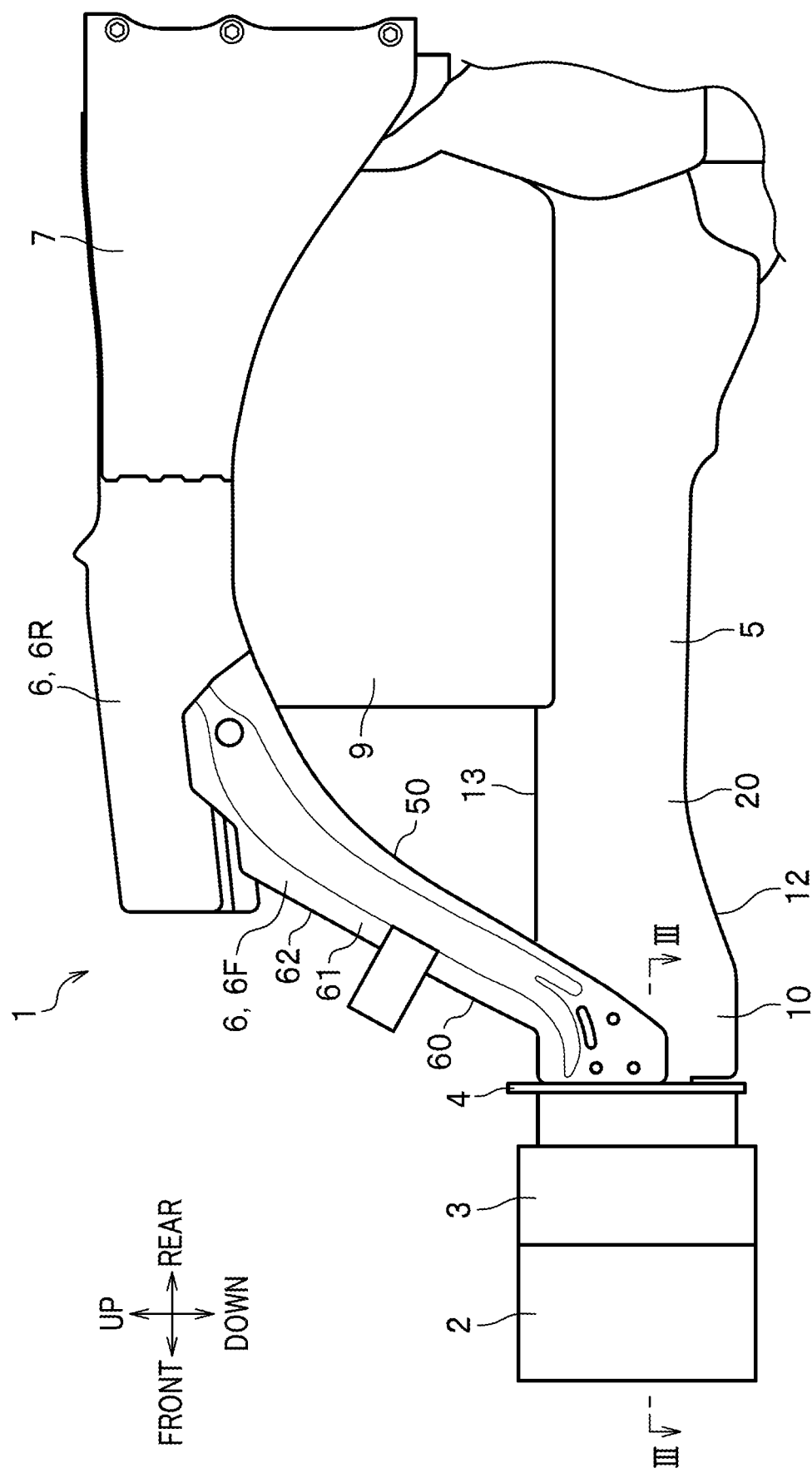
FIG. 1 is a schematic side view of a vehicle front structure according to an embodiment of the present invention.

Next, a description is given in detail of an embodiment of the present invention, taking a case where a vehicle front structure of the present invention is applied to a left side of a vehicle as an example, with reference to the drawings as appropriate. In the drawings, "front-rear" refers to a front-rear direction in which a vehicle travels, and "right-left" refers to a right-left direction (vehicle width direction) as viewed from a driver's seat, respectively.

Figure 2:
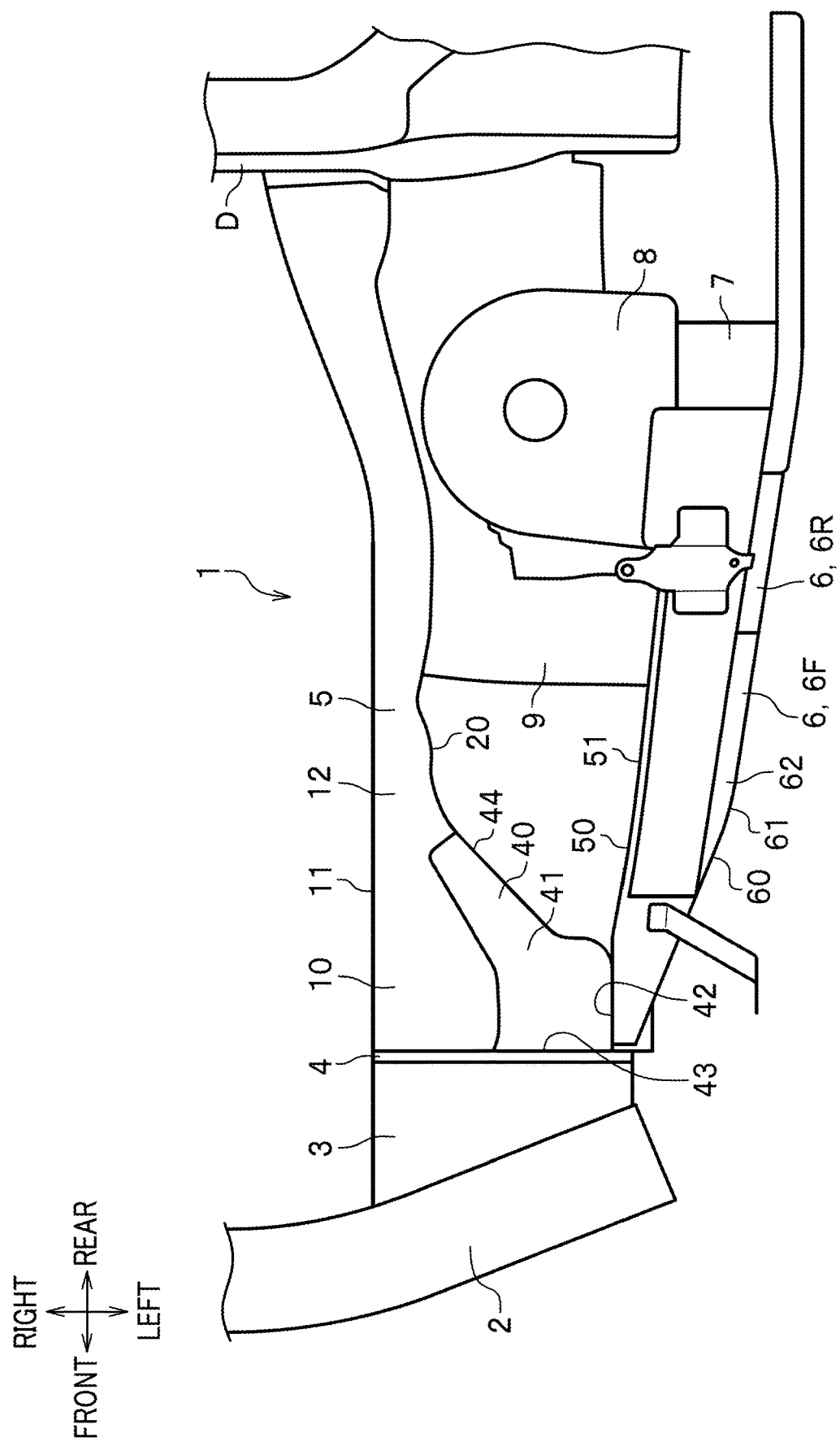
FIG. 2 is a schematic plan view of the vehicle front structure according to then embodiment of the present invention.

As shown in FIGS. 1 and 2, a vehicle front structure 1 of the embodiment of the present invention includes a bumper beam 2, an extension 3, a bracket 4, a front side-frame 5, a lower member 6, an upper member 7, a damper base 8, and a damper housing 9.

<Bumper Beam>

The bumper beam 2 is a metal framework member extending in the vehicle width direction at a front end of the vehicle.

<Extension>

The extension 3 is a metal framework member extending rearward from an end in the vehicle width direction of the bumper beam 2. The extension 3 has a substantially rectangular closed cross-sectional shape in a front view and transmits a frontal collision load applied to the bumper beam 2 via the bracket 4 to the front side-frame 5 and the lower beam 6 on a rear side thereof.

<Bracket>

The bracket 4 is a metal plate member for coupling a rear end of the extension 3 to front ends of the front side-frame 5 and the lower member 6.

<Front Side-Frame>

The front side-frame 5 is a metal framework member extending in a vehicle front-rear direction at a front of the vehicle body. The front side-frame 5 has a substantially rectangular closed cross-sectional shape in a front view. A rear end of the front side-frame 5 is coupled to a dashboard D to separate a power compartment from a passenger compartment. An outer end in the vehicle width direction of the front side frame 5 is inclined outer in the vehicle width direction toward the front of the vehicle body. The front side-frame 5 includes an inner front side-frame 10, an outer front side-frame 20, a lower extension 30 (see FIG. 3), and an upper extension 40.

<<Inner Front Side-Frame>>

The inner front side-frame 10 integrally includes an inner wall 11, a bottom wall 12 extending outward in the vehicle width direction from a lower end of the inner wall 11, and a top wall 13 extending outward in the vehicle width direction from an upper end of the inner wall 11. In addition, the inner front side-frame 10 integrally includes a lower flange extending downward from an outer end in the vehicle width direction of the bottom wall 12 and an upper flange extending upward from an outer end in the vehicle width direction of the top wall 13.

<<Outer Front Side-Frame>>

The outer front side-frame 20 forms an outer wall of the front side-frame 5. The outer front side-frame 20 is joined, at a lower end thereof, to the lower flange of the inner front side-frame 10 by welding or the like. The outer front side-frame 20 is joined, at an upper end thereof, to the upper flange of the inner front side-frame 10 by welding or the like.

<<Lower Extension>>

The lower extension 30 forms an outer portion in the vehicle width direction, at front ends, of the outer wall in the vehicle width direction and the lower wall of the front side-frame 5. The lower extension 30 integrally includes a lower wall 31 and a rear wall 32 extending upward from a rear end of the lower wall 31. The front end of the lower wall 31 is joined to the bracket 4 by welding or the like.

<<Upper Extension>>

The upper extension 40 forms an outer portion in the vehicle width direction, at a front end, of the top wall of the front side-frame 5. The upper extension 40 integrally includes an upper wall 41, an outer flange 42 extending upward from an outer end in the vehicle width direction of the upper wall 41, a front flange 43 extending upward from a front end of the upper wall 41, and a rear flange 44 extending upward from a rear end of the upper wall 41. The upper wall 41 is, at an inner end in the vehicle direction thereof, joined to the outer end in the vehicle width direction of the top wall 13 of the inner front side-frame 10, by welding or the like. A rear portion of the outer flange 42 is joined to an inner wall 51 of an inner front lower member 50, to be described below, by welding or the like. A front portion of the outer flange 42 is joined to an outer wall 61 of an outer front lower member 60, to be described below, by welding or the like. The front flange 43 is joined to the bracket 4 by welding or the like. The rear flange 44 is joined to an upper end of the rear wall 32 of the lower extension 30 by welding or the like.

<Lower Member>

The lower member 6 is a metal framework member extending in the vehicle front-rear direction at the front of the vehicle. The lower member 6 is provided on an outer side in the vehicle width direction of the front side-frame 5 and inclined so as to be positioned higher toward the rear. An inner end in the vehicle width direction of the lower member 6 extends in the vehicle front-rear direction, without inclining inner in the vehicle width direction toward the front of the vehicle body.

The lower member 6 is formed with a front lower member 6F and a rear lower member 6R combined with each other.

<Front Lower Member>

The front lower member 6F is a member forming a front portion of the lower member 6. The front lower member 6F is inclined so as to be positioned higher toward the rear. The front lower member 6F is formed with the inner front lower member 50 and the outer front lower member 60 combined with each other.

<<Inner Front Lower Member>>

The inner front lower member 50 integrally includes the inner wall 51 and a lower wall 52 extending outward in the vehicle width direction from a lower end of the inner wall 51. The lower wall 52 has a shape becoming narrower toward the front. A front end of the lower wall 52 is positioned behind a front end of the inner wall 51. The front end of the lower wall 52 is joined to the rear wall 32 of the lower extension 30 by welding or the like.

<<Outer Front Lower Member>>

The outer front lower member 60 integrally includes the outer wall 61 and an upper wall 62 extending inward in the vehicle width direction from an upper end of the outer wall 61. The upper wall 62 has a shape becoming narrower toward the front and ends behind a front end of the outer front lower member 60. A front end of the outer wall 61 is positioned in front of the front end of the inner wall 51 and is disposed at the same position in the vehicle width direction as an outer wall of the extension 3 and the inner wall 51 of the inner front lower member 50. That is, the front end of the lower member 6 is continuous in the vehicle front-rear direction to the outer wall (outer end in the vehicle width direction) of the extension 3.

In addition, the outer front lower member 60 integrally includes an outer flange extending outward in the vehicle width direction from a lower end of the outer wall 61 and an upper flange extending upward from an upper end of the upper wall 62. The outer flange is joined to an outer end in the vehicle width direction of the lower wall 52 by welding or the like. The upper flange is joined to an upper end of the inner wall 51 by welding or the like.

Figure 3:
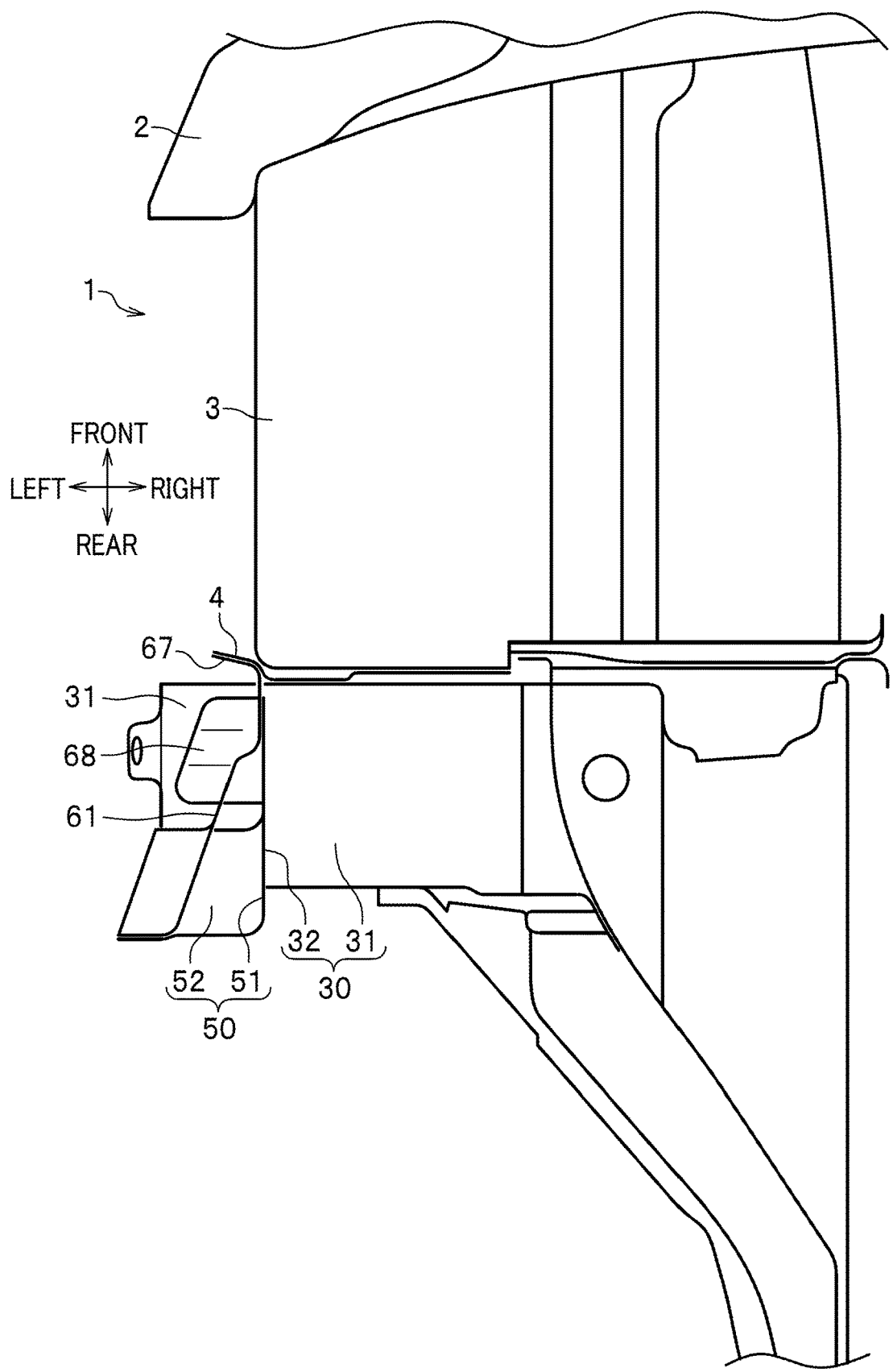
FIG. 3 is a cross-sectional view of the structure in FIG. 1, taken along a line 111-111 in FIG. 1.
Figure 4:
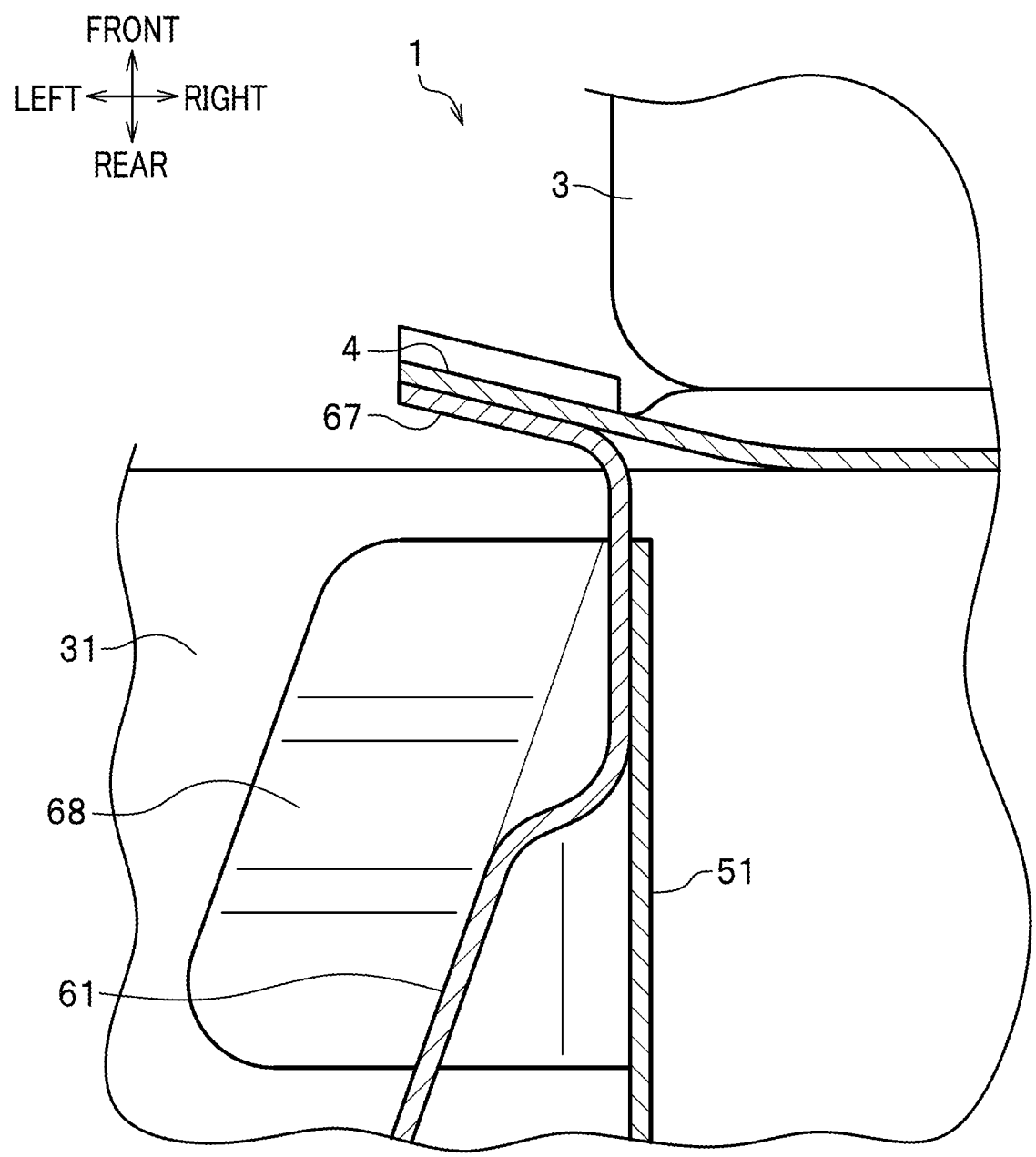
FIG. 4 is a partially enlarged view of the structure in FIG. 3.
Figure 5:
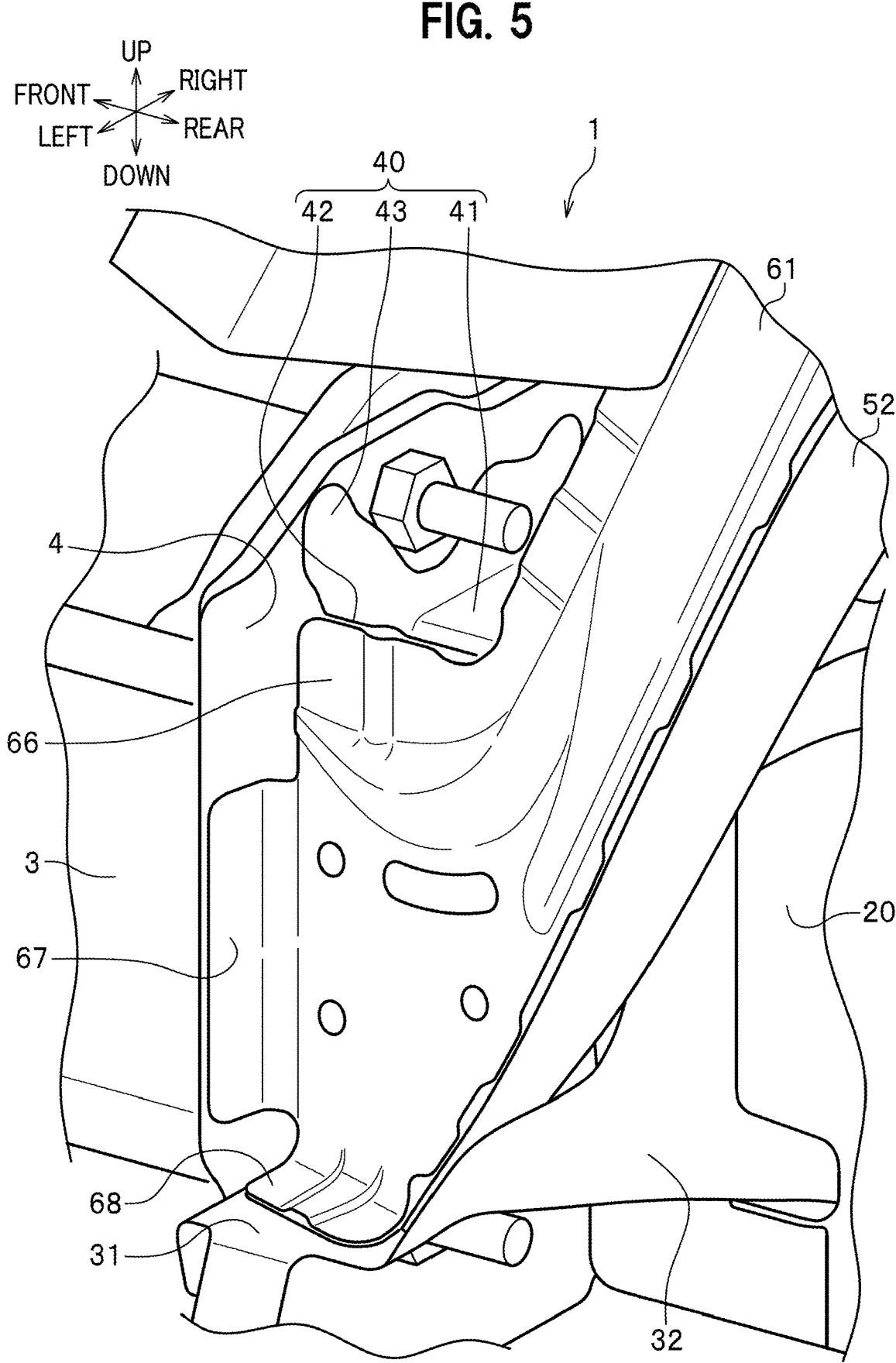
FIG. 5 is a schematic perspective view of a bracket and its vicinity of the vehicle front structure according to the embodiment of the present invention.

The outer front lower member 60 includes a first flange 66, a second flange 67, and a third flange 68, as shown in FIGS. 3 to 5. The first flange 66 extends upward from a top of a front end of the outer wall 61, and is abutted against an outer side in the vehicle width direction of the upper extension 40 of the front side-frame 5 and joined to the upper extension 40 by welding or the like. The second flange 67 extends outward in the vehicle width direction of the outer wall 61 from an intermediate portion in a height direction of a front end of the outer wall 61, and is abutted against a backside of the bracket 4 and joined to the bracket 4 by welding or the like. The third flange 68 extends outward in the vehicle width direction from a bottom of a front end of the outer wall 61, and is placed on the lower wall 31 of the lower extension 30 of the front side-frame 5 and joined to the lower wall 31 by welding or the like.

<Rear Lower Member>

The rear lower member 6R is a member forming a rear portion of the lower member 6, as shown in FIGS. 1 and 2. The rear lower member 6R extends in the vehicle front-rear direction, and has a rear end of the inner front lower member 50 joined to a front lower end thereof by welding or the like. A front end of the rear lower member 6R is joined to a front bulkhead (not shown) by welding or the like.

<Upper Member>

The upper member 7 is a metal framework member extending in the vehicle front-rear direction at the front of the vehicle. A front end of the upper member 7 has a rear end of the rear lower member 6R joined thereto by welding or the like. A rear end of the upper member 7 is joined to the front pillar (not shown) by welding or the like.

<Damper Base>

The damper base 8 is a member to support a damper suspending a front wheel of the vehicle. The damper base 8 is joined to inner sides in the vehicle width direction of a rear end of the lower member 6F and the front end of the upper member 7 by welding or the like.

<Damper Housing>

The damper housing 9 is a member to cover the damper, suspending the front wheel of the vehicle, from inside in the vehicle width direction. An upper end of the damper housing 9 is joined to a lower end of the damper base 8 by welding or the like, and a lower end of the damper housing 9 is joined to the front side-frame 5 by welding or the like.

When a frontal collision load, particularly an offset load, is applied to the vehicle front structure 1, most of the load is transmitted to the front side-frame 5 instead of the lower member 6. Additionally, a part of the load is transmitted linearly in the front-rear direction from an outer end in the vehicle width direction of the extension 3 to the lower member 6.

The vehicle front structure 1 according to the embodiment of the present invention includes: the front side-frame 5 extending in the vehicle front-rear direction; and the lower member 6 extending in the vehicle front-rear direction at a position outer in the vehicle width direction than the front side-frame 5, wherein the front end of the front side-frame 5 and the front end of the lower member 6 are coupled with each other, the outer end in the vehicle width direction of the front side-frame 5 is inclined so as to be positioned outer in the vehicle width direction toward the front of the vehicle body, and the inner end in the vehicle width direction of the lower member 6 extends in the vehicle front-rear direction, without being inclined inward in the vehicle width direction toward the front of the vehicle body. Accordingly, as an inner surface in the vehicle width direction of the lower member 6 extends in the vehicle front-back direction, the vehicle front structure 1 improves efficiency of the lower member 6 absorbing a frontal collision load in the event of an offset collision. In addition, as the outer end in the vehicle width direction of the front side-frame 5 extends outward in the vehicle width direction, the vehicle front structure 1 suitably transmits most of the frontal collision load in the event of an offset collision to the front side-frame 5, to fully exploit a portion of the front side-frame 5 broken to absorb the load, so that efficiency of the front side-frame 5 absorbing the load is improved. Further, the vehicle front structure 1 reduces an amount of the frontal collision load transmitted to the lower member 6 in the event of an offset collision, to effect reducing the lower member 6 and other components thereof, closer to a cabin than the lower member 6, in weight.

Still further, in the vehicle front structure 1, the lower member 6 becomes narrower in the vehicle width direction toward the front of the vehicle body. Accordingly, the vehicle front structure 1 effects reducing the extension 3 in size in the vehicle width direction.

Still further, the vehicle front structure 1 includes the bumper beam 2 extending in the vehicle width direction at the front of the vehicle body, and the extension 3 connecting the rear end of the bumper beam 2 with the front end of the lower member 6, wherein the front end of the lower member 6 is continuous in the vehicle front-rear direction to the outer end in the vehicle width direction of the extension 3. Accordingly, the vehicle front structure 1 improves efficiency of transmitting a load from the extension 3 to the lower member 6.

Still further, the vehicle front structure 1 includes the bracket 4 coupled to the front end of the front side-frame 5 and the front end of the lower member 6, and the lower member 6 is coupled to both the front side-frame 5 and the bracket 4. Accordingly, the vehicle front structure 1 improves anchorage strength, at the front end, of the lower member 6.

Still further, in the vehicle front structure 1, the lower member 6 includes the first flange 66 extending upward from the top of the front end thereof, the second flange 67 extending outward in the vehicle width direction from the front end thereof, and the third flange 68 extending downward from the bottom of the front end thereof, wherein the first flange 66 and the third flange 68 are coupled to the front side-frame 5 and the second flange 67 is coupled to the bracket 4. Accordingly, the vehicle front structure 1 further improves anchorage strength, at the front end, of the lower member 6.

Still further, in the vehicle front structure 1, the first flange 66 is coupled with the front side-frame 5 so as to abut each other in the vehicle width direction, the second flange 67 is coupled with the bracket 4 so as to abut each other in the vehicle front-rear direction, and the third flange 68 is vertically placed on, and coupled with, the front side-frame 5. Accordingly, the vehicle front structure 1 has the front end of the lower member 6 fixed in three different directions, to further improve anchorage strength, at the front end, of the lower member 6.

Hereinabove, the embodiment of the present invention has been described, but the present invention is not limited thereto and can be modified as desired within the range thereof.

LIST OF REFERENCE SIGNS

1: vehicle front structure, 2: bumper beam, 3: extension, 4: bracket, 5: front side-frame, 6: lower member, 6F: front lower member, 6R: rear lower member, 7: upper member, 8: damper base, 9: damper housing, 10: inner front side-frame, 20: outer front side-frame, 30: lower extension, 40: upper extension, 50: inner front lower member, and 60: outer front lower member.

What is claimed is:
1. A vehicle front structure comprising:
   a front side-frame extending in a vehicle front-rear direction;
   a lower member extending in the vehicle front-rear direction at a position outer in a vehicle width direction than the front side-frame; and
   a bracket coupled to a front end of the front side-frame and a front end of the lower member, wherein
   the front end of the front side-frame and the front end of the lower member are coupled with each other,
   an outer end in the vehicle width direction of the front side-frame is inclined so as to be positioned outer in the vehicle width direction toward a front of a vehicle body, and
   an inner end in the vehicle width direction of the lower member extends in the vehicle front-rear direction, without being inclined inward in the vehicle width direction toward the front of the vehicle body,
   the lower member is coupled to both the front side-frame and the bracket,
   the lower member includes:
   a first flange extending upward from a top of the front end thereof;
   a second flange extending outward in the vehicle width direction from the front end thereof; and
   a third flange extending outward in the vehicle width direction from a bottom of the front end thereof, wherein the first flange and the third flange are coupled to the front side-frame and the second flange is coupled to the bracket.

2. The vehicle front structure according to claim 1, wherein
the first flange is coupled with the front side-frame so as to abut each other in the vehicle width direction,
the second flange is coupled with the bracket so as to abut each other in the vehicle front-rear direction, and
the third flange is vertically placed on, and coupled with, the front side-frame.

3. The vehicle front structure according to claim 1, further comprising:
a bumper beam extending in the vehicle width direction at the front of the vehicle, and
an extension connecting a rear end of the bumper beam with the front end of the lower member,
wherein the front end of the lower member is continuous in the vehicle front-rear direction to an outer end in the vehicle width direction of the extension.

* * * * *